United States Patent [19]

Montgomery et al.

[11] 4,068,392

[45] Jan. 17, 1978

[54] INTERACTION AND RELATIVITY CART

[75] Inventors: Marshall A. Montgomery, Napa; Robert Karplus, Orinda, both of Calif.

[73] Assignee: Rand McNally & Company, Skokie, Ill.

[21] Appl. No.: 727,457

[22] Filed: Sept. 28, 1976

[51] Int. Cl.² .................. G09B 23/08; G09B 23/18
[52] U.S. Cl. ............................ 35/19 R; 35/19 A; 46/236
[58] Field of Search ............... 35/19 R, 19 A; 46/23, 46/221, 223, 236, 241, 238; 272/70; 40/12

[56] References Cited

U.S. PATENT DOCUMENTS

| 518,326 | 4/1894 | McArdle | 40/12 |
| 1,826,180 | 10/1931 | Klopsteg | 35/19 R |
| 2,577,120 | 12/1951 | Franz | 46/23 UX |
| 3,299,535 | 1/1967 | Stull | 35/19 R |
| 3,711,991 | 1/1973 | Orfei | 35/19 A X |
| 3,811,218 | 5/1974 | Salmon | 46/223 |

OTHER PUBLICATIONS

Welch Laboratory Apparatus Catalog, Oct. 1965, pp. 63, 83, 170.
Ealing 1969 Science Teaching Catalog, pp. 25, 28, 29, 30, 31, 33, 38.

Primary Examiner—Harland S. Skogquist
Attorney, Agent, or Firm—Kinzer, Plyer, Dorn & McEachran

[57] ABSTRACT

A vehicle for use as an educational toy to demonstrate elastic interaction and magnetic attraction and repulsion includes a vehicle body and wheels for movably supporting the body. A magnet is supported on the body at one end thereof and an elastic member is supported on the body at the opposite end thereof.

1 Claim, 4 Drawing Figures

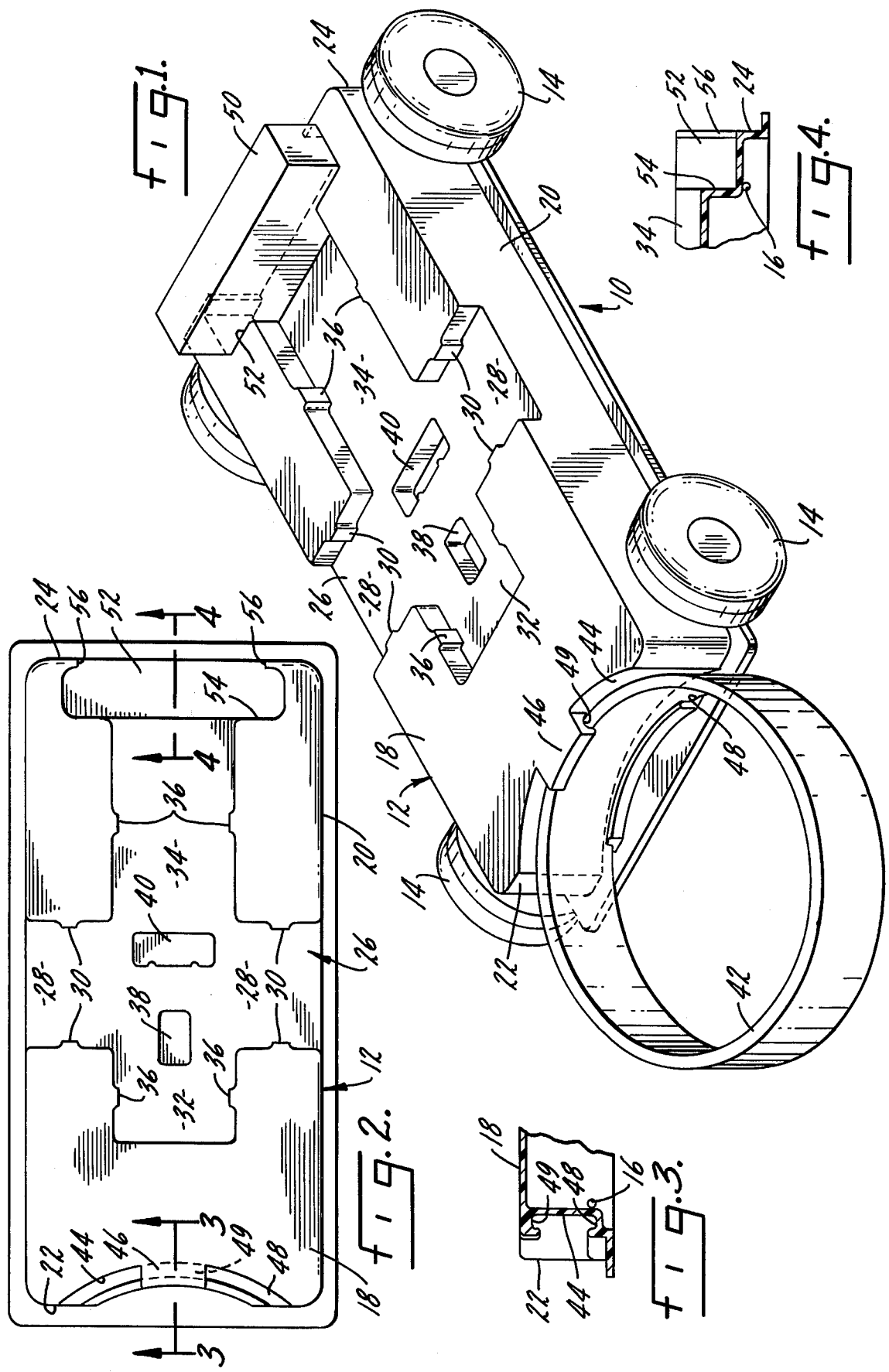

INTERACTION AND RELATIVITY CART

SUMMARY OF THE INVENTION

The present invention relates to an educational toy and in particular to such a toy which can be used to demonstrate both elasticity or elastic interaction and magnetic attraction and repulsion.

A primary purpose of the invention is an educational toy of the type described including a vehicle body, wheels for supporting the body, a magnet at one end of the vehicle body and an elastic member at the opposite end of the vehicle body.

Another purpose is an easy-to-assemble low maintenance educational toy of the type described.

Another purpose is an educational toy which reliably and vividly demonstrates elastic interaction and magnetic attraction and repulsion.

Other purposes will appear in the ensuing specification, drawings and claims.

BRIEF DESCRIPTION OF THE DRAWINGS

The invention is illustrated diagrammatically in the following drawings wherein:

FIG. 1 is a perspective of a vehicle of the type described,

FIG. 2 is a top view of the vehicle body,

FIG. 3 is a section along plane 3—3 of FIG. 2, and

FIG. 4 is a section along plane 4—4 of FIG. 2.

DESCRIPTION OF THE PREFERRED EMBODIMENT

Education research suggests that the best method for introducing young children to science concepts is to provide them with concrete experiences which clearly demonstrate a particular concept. Such concrete experiences require careful planning and selection of equipment. The present invention is specifically designed to focus attention on magnetic and elastic interaction. The structure and its use is appealing to children, easy to assemble, requires little maintenance, and reliably and visibly demonstrates the phenomena of interaction, interaction at a distance, and evidence of interaction.

In use, there may be one or two such carts, depending upon the particular demonstration and teaching process. In the drawings, a vehicle is indicated generally at 10 and may include a vehicle body 12 which preferably is formed of a plastic shell. The vehicle body may be movably supported on suitable wheel means which may take a variety of different forms and, as shown herein, there are four wheels 14 each journaled on a suitable axle. The axles will pass through holes 16 formed in the sides of the vehicle body.

Vehicle body 12 includes a top 18, sides 20, a front end 22 and a rear end 24. Top 18 may have a somewhat cross-shaped recess 26 which is of a form and shape to accept a replica of a human form. Such a replica may be used in various demonstrations utilizing the described device. Each of the side arms 28 of recess 26 may have projections 30 and in like manner the longitudinal arms 32 and 34 of recess 26 may similarly have projections 36. Such projections will interlock with recesses on the described human form in order to position the form in a number of different ways within the confines of recess 26. Similarly, recess 26 may have spaced recesses 38 and 40 which will be utilized to position the human form in an upright manner upon the vehicle body.

At the front end of the vehicle there is an elastic device in the form of a plastic loop 42 which is positioned within a curved recess 44. An outwardly-extending latch member 46 is formed integral with body 12 at the top of recess 44 and there is a curved shoulder 48 formed at the bottom of recess 44. Thus, plastic loop 42 will be captured within the groove formed by curved shoulder 48 and held in position within slot 49 in latch member 46 so that the plastic loop is firmly attached to the vehicle. The plastic loop may be simply removed as it will normally be flexible.

At the rear end of vehicle 10 is a bar magnet 50 which fits within a recess 52 having an inner wall 54 and outward inturned projections 56 which are effective to hold the magnet within the recess.

It is important to note that the only part of the entire assembly with any substantial weight is the magnet and the magnet and its recess are positioned above and near the rear axle to provide stability for the vehicle during use.

To demonstrate the concept of the elastic interaction, only one vehicle need be used. The thin plastic loop 42 is fitted within curved recess 44. The vehicle is rolled toward an object or obstruction and as contact is made, the plastic loop compresses storing energy. The compressed plastic loop, if allowed to resume its original shape, drives the vehicle in the opposite direction. Two such carts with plastic loops may be used to demonstrate a chain interaction.

To demonstrate the concept of magnetic interaction or the forces of magnetic repulsion and attraction, two vehicles may be used. Magnets 50 are placed in the designated recesses and the vehicles are moved toward each other. Depending upon which poles of the magnet face outward, the vehicles or carts will either be attracted toward each other or repelled away from each other.

A combination of magnetic and elastic interaction may be demonstrated if both magnets and plastic loops are used. For example, two carts are placed between two vertical obstructions so that the magnet ends of the carts face and repel each other. If cart A is moved toward cart B, cart B is repelled and moved into the vertical obstruction compressing the plastic loop. If cart A is then released, cart B is free to push away from the obstruction, repelling cart A toward the opposite obstruction. The interaction of compressing the plastic loop is then repeated at the opposite obstruction.

The strength of elastic and magnetic interaction may be compared quantitatively by the following procedure, making use of two carts, two magnets and one plastic loop. Two carts, A and B, with magnets arranged to repel each other are placed face to face. A heavy obstruction is placed against the plastic loop affixed to one of the carts, cart A, and cart B is advanced toward cart A with the result that the elastic member or spring is gradually compressed. At several positions during this process, the magnet-to-magnet distance and the plastic loop compression may be measured and a graph may be used to show the loop compression as a function of the magnet-to-magnet distance.

It may be advantageous in demonstrations for small children to utilize a human replica as a reference frame. Such a human replica may be positioned on the vehicle in six different ways. The replica is used, as the cart is moved along, so that the relative position and motion of objects adjacent the cart may be observed by the students. Changing the position of the human form results in different observations. The human form placed on the cart may be used as a reference frame for describing the apparent motion of objects on a laboratory table beside the vehicle or cart, or of the motion of a second cart interacting or colliding with the first one as a result of magnetic or elastic interaction.

Although plastic is a preferred and an inexpensive means for forming the vehicle body, there are other structures which are equally satisfactory. It is preferred that the vehicle body be lightweight and formed of a non-magnetic material and that the wheels or movable support means for the body have little friction so that only a small effort is required to move the vehicle and so that the magnetic and elastic forces can easily be used to demonstrate the desired proposition and concepts.

Whereas the preferred form of the invention has been shown and described herein, it should be realized that there may be many modifications, substitutions and alterations thereto.

The embodiments of the invention in which an exclusive property or privilege is claimed are as follows:

1. A vehicle for use as an educational toy to demonstrate elastic interaction and magnetic attraction and repulsion, including a vehicle body, a pair of spaced axles journaled in said body, with each axle having a pair of wheels positioned on opposite ends thereof,
a magnet, a recess for positioning and supporting said magnet adjacent one end of said body, said recess being generally parallel to and positioned above one of said axles,
an elastic ring extending outwardly from the opposite end of said body and positioned to contact an obstruction ahead of said body when the vehicle is moved toward an obstruction, means on said body for removably positioning and supporting said ring including a curved recess formed on said vehicle body and latch means integral with said body and positioned on opposite sides of said curved recess,
and a general centrally disposed recess in said body for use in supporting and positioning a replica of a human figure for demonstration purposes.

* * * * *